United States Patent [19]

Ceruti et al.

[11] 4,152,549
[45] May 1, 1979

[54] SUPPRESSOR OF SPURIOUS RINGING CURRENTS FOR TELEPHONE APPARATUS

[75] Inventors: Rodolfo Ceruti, Turin; Oreste Malerba, Trofarello, both of Italy

[73] Assignee: CSELT - Centro Studi e Laboratori Telecomunicazioni S.p.A., Turin, Italy

[21] Appl. No.: 850,809

[22] Filed: Nov. 11, 1977

[30] Foreign Application Priority Data

Nov. 12, 1976 [IT] Italy .............................. 69699 A/76

[51] Int. Cl.² .............................................. H04M 1/74
[52] U.S. Cl. ................................................ 179/84 R
[58] Field of Search ...................................... 179/84 R

[56] References Cited
U.S. PATENT DOCUMENTS 4,031,332  6/1977  Shylo ............................. 179/84 R Primary Examiner—George G. Stellar
Attorney, Agent, or Firm—Karl F. Ross

[57] ABSTRACT

A subscriber's telephone set, provided with a ringer connected in series with a capacitor across a line loop, is provided with a unit for the suppression of spurious ringing currents including an antiparallel connection of a diode and a transistor in series with the ringer/capacitor combination. The transistor has a base/emitter circuit connected across the line loop by way of a Zener diode and an R/C network. The Zener diode breaks down in response to oscillations whose frequency and amplitude are characteristic of genuine ringing currents from the associated central office, thereby driving the transistor into conduction and enabling the ringer to operate; other oscillations or pulse trains, such as those due to dialing pulses generated by another telephone set connected across the same line loop, remain ineffectual with the transistor cut off.

11 Claims, 3 Drawing Figures

SUPPRESSOR OF SPURIOUS RINGING CURRENTS FOR TELEPHONE APPARATUS

FIELD OF THE INVENTION

Our present invention relates to a subscriber's telephone set, connected to a central office via a normally open-circuited line loop, and more particularly to a unit in such a set designed to suppress spurious ringing currents.

BACKGROUND OF THE INVENTION

In the usual telephone set, a ringer or bell is connected across the conductors of the line loop in series with a capacitor blocking the passage of direct current therethrough. With the line loop open-circuited, alternating current from the central office can still pass through the electromagnetic coil of the ringer by way of the series capacitor. Even though the ringing currents have a predetermined frequency, generally of about 25 Hz, the ringer may respond to oscillations or pulse trains of lower frequency such as, for example, dialing pulses generated at a cadence of about 10 Hz by another telephone set connected across the same line loop. This is inconvenient for several reasons. Thus, a subscriber mistaking the spurious rings for an incoming call may pick up the telephone handset and thereby interfere with the dialing process of the other subscriber; furthermore, the first subscriber may monitor dialing pulses of the second subscriber against the wishes of the latter.

OBJECT OF THE INVENTION

The object of our present invention, therefore, is to provide simple and effective means for insulating the ringer of a subscriber's telephone set against spurious changes in line voltage.

SUMMARY OF THE INVENTION

We realize this object, in accordance with our present invention, by the provision of a suppressor unit comprising normally nonconductive electronic switch means in series with the ringer and the associated capacitor, i.e. in a shunt branch of the line loop, and threshold-sensing means connected across that loop for rendering the electronic switch means conductive in response to incoming oscillations of a predetermined minimum amplitude.

According to a more particular feature of our invention, the electronic switch means comprises a transistor which is shunted by a diode in antiparallel relationship therewith whereby current can flow only in one direction through the shunt branch when the transistor is cut off. Because of the presence of the series capacitor, such unidirectional current flow cannot effectively energize the ringer.

In some instances the protection afforded by a threshold sensor discriminating only against alternating voltages below a certain level may not be sufficient. Thus, whereas the peak-to-peak voltage difference of a true ringing current may range between about 100 and 200 V, spurious oscillations generated by the dial of a nearby telephone set may reach voltage levels of 80 to 120 V. We therefore prefer to incorporate the threshold-sensing means in a resistive/capacitive network of a time constant allowing the buildup of a trigger voltage above the threshold level in the presence of a ringing frequency (e.g. of 25 Hz) but preventing such buildup with significantly lower frequencies even if the spurious oscillations or pulses have the same amplitude as the genuine ringing current. The threshold sensor advantageously comprises a Zener diode inserted between the resistive/capacitive network and an input electrode of the transistor, specifically its base.

BRIEF DESCRIPTION OF THE DRAWING

The above and other features of our invention will now be described in detail with reference to the accompanying drawing in which.

SPECIFIC DESCRIPTION

Figure 1:
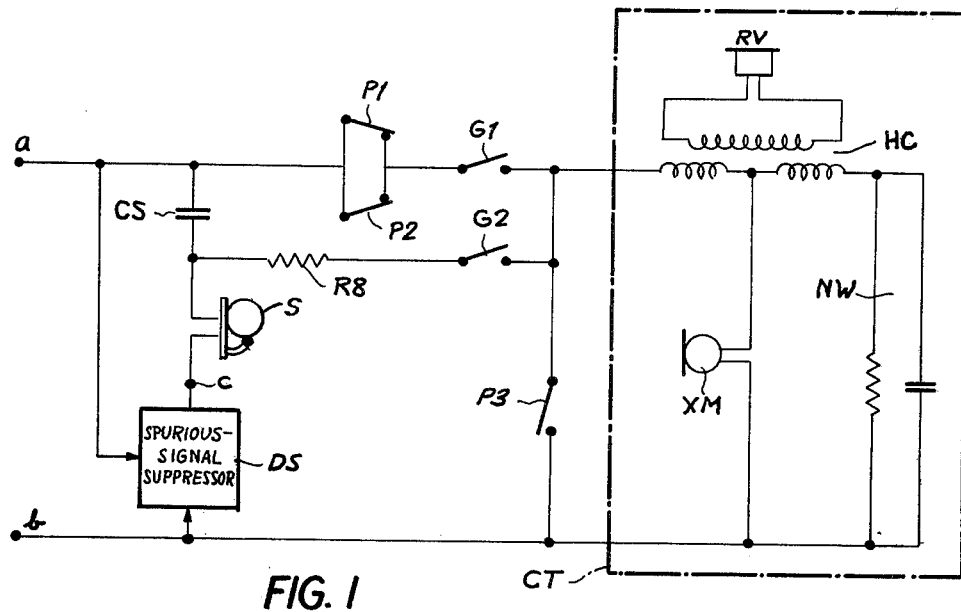
FIG. 1 is a circuit diagram of a generally conventional telephone set provided with a suppressor unit according to our invention.

In FIG. 1 we have shown a pair of line wires a, b originating at a nonillustrated central office and terminating at a subscriber station in a loop normally open-circuited by contacts G1 of the usual hook switch inserted in lead a, the hook switch also having contacts G2 which together with contacts G1 connect a resistor R8 (e.g. of about 100 ohms) across a capacitor CS. Capacitor CS, which may have a capacitance of about 1 $\mu$F, lies in series with a ringer S in a shunt path connected across conductors a and b, that path further including a unit DS according to our invention for the suppression of spurious signals; unit DS has inputs connected to conductors a and b as well as an output terminal c tied to ringer S.

The line loop completed upon closure of contacts G1 includes a split primary winding of a hybrid-coil transformer HC between lead a and an impedance-balancing network NW, as is well known in the art. Transformer HC has a secondary winding connected across a receiver RV which is decoupled from a transmitter or microphone XM inserted between the midpoint of the transformer primary and lead b.

A nonillustrated dial on the subscriber's telephone set generates pulses on the line a, b by briefly opening two sets of parallel contacts P1, P2 in lead a and concurrently closing a pair of shunt contacts P3 whereby resistor R8 is temporarily connected across ringer S instead of across capacitor CS. The resulting dial pulses transmitted toward the central office can also be picked up by other telephone sets connected across lines a, b, especially those lying between the active telephone set and the central office. In the absence of a protective device such as unit DS, therefore, the ringer S of any such telephone set may be actuated by the dial of any telephone set on the same line farther from the central office.

Figure 2A:
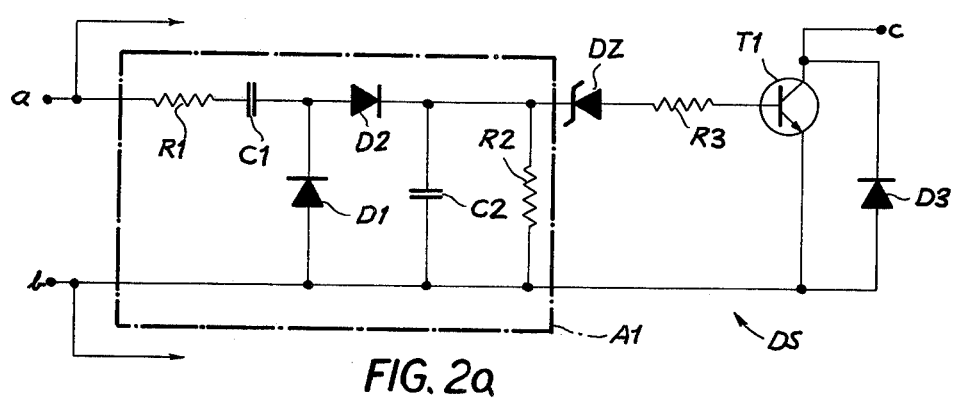
FIGS. 2a and 2b show details of two embodiments of the suppressor unit illustrated in block form in FIG. 1.

In FIG. 2a we have shown details of an embodiment of suppressor unit DS comprising a normally nonconductive NPN transistor T1 inserted between conductor b and terminal c, the collector/emitter circuit of that transistor being bridged by a rectifying diode D3 in antiparallel relationship therewith. A network A1, connected across leads a and b, comprises a resistor R1 in series with a blocking condenser C1 and a diode D2 in a charging circuit of a storage capacitor C2, another diode D1 being connected in aiding relationship with diode D2 between lead b and the junction of diode D2 with capacitor C1. The storage capacitor C2 is shunted by a resistor R2 forming a discharge path therefor. Thus, the charging circuit of capacitor 2 has a time constant different from and preferably lower than that of its discharge circuit whereby, in the presence of ringing current on the line, capacitors C1 and C2 are both charged to a level substantially corresponding to the peak-to-peak amplitude of that current. Capacitor C2 is connected across the base/emitter circuit of transistor T1 via a Zener diode DZ in series with a base resistor R3, the threshold of this Zener diode being less than the voltage of capacitor C2 in the presence of ringing current whereby diode DZ breaks down and saturates the transistor T1.

With transistor T1 fully conductive, alternating current passes freely through ringer S and series capacitor C2 (FIG. 1) to produce an audible call signal. When the oscillations cease, storage capacitor C2 discharges through resistor R2 and Zener diode DZ returns to its high-resistance state, thus again cutting off the transistor T1.

If a train of parasitic impulses of a cadence substantially lower than the ringing frequency appears on conductors a and b, capacitor C2 is partially discharged via resistor R2 between pulses so that its voltage will remain substantially below the pulse amplitude. Zener diode DZ, therefore, will not break down even though that pulse amplitude may exceed its threshold level; with transistor T1 nonconductive, the first pulse of a pulse train of a polarity passed by the diode D3 will charge the capacitor CS to block further pulse transmission through ringer S.

Figure 2B:
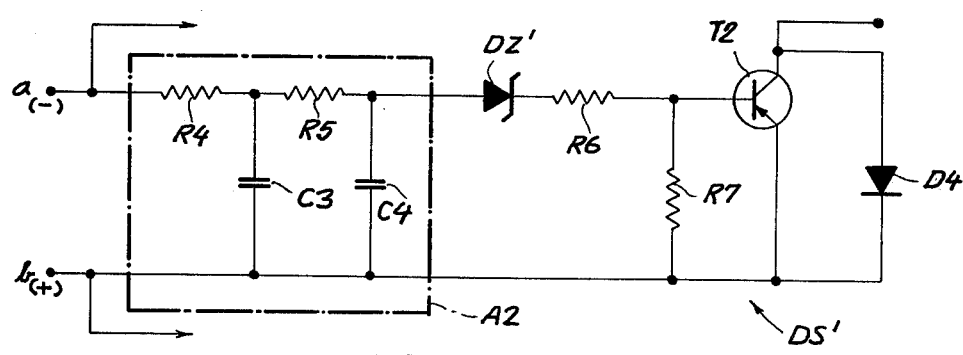

In FIG. 2b we have shown a modified suppressor unit DS' with an R/C network A2 comprising a pair of series resistors R4 and R5 and a pair of shunt capacitors C3 and C4. These resistors and capacitors form an integrating circuit which charges the capacitor C4 to a voltage substantially equaling the mean amplitude of an incoming oscillation. The voltage stored on capacitor C4 is applied across a Zener diode DZ' in series with a voltage divider R6, R7; a tap of this voltage divider is connected to the base of PNP transistor T2 whose base/emitter path is shunted by resistor R7. A rectifying diode D4 is connected in antiparallel relationship with transistor T2 between lead b and terminal c, in a manner analogous to that of transistor T1 and diode D3 in FIG. 2a.

With the arrangement of FIG. 2b it is necessary that conductor a be more negative than conductor b, as shown. Since network A2 does not include a blocking capacitor, a small current will continuously flow through the reverse resistance of diode DZ' and voltage divider R6, R7. The resulting voltage drop across resistor R7 will be insufficient, however, to turn on the normally cut-off transistor T2 so that spurious pulses or oscillations, of a mean amplitude falling short of the breakdown potential of Zener diode DZ', will be ineffectual as far as ringer S (FIG. 1) is concerned. In the presence of genuine ringing current on the line, however, transistor T2 is saturated so that both half-cycles of that current may again pass through the combination of this transistor and its shunt diode to actuate the ringer.

If the conductors a and b of FIG. 2b were energized with reverse polarity, transistor T2 would be permanently blocked. In the circuitry of FIG. 2a, that polarity is immaterial.

We claim:

1. In a subscriber's telephone set connected to a central office by way of a normally open-circuited line loop and provided with a ringer lying together with a series capacitor in a shunt branch of the line loop, the combination therewith of a unit for the suppression of spurious ringing currents, said unit comprising a normally nonconductive transistor and a diode inserted in antiparallel relationship in said shunt branch and further comprising threshold-sensing means connected across said line loop for rendering said transistor conductive in response to incoming oscillations of a predetermined minimum amplitude.

2. The combination defined in claim 1 wherein said threshold-sensing means comprises a resistive/capacitive network and a Zener diode inserted between said network and said transistor for maintaining the latter cut off in the absence of alternating voltages sufficient to break down said Zener diode.

3. The combination defined in claim 2 wherein said transistor has an emitter and a base connected across said network, said Zener diode being inserted between said network and said base.

4. The combination defined in claim 3 wherein said network comprises a storage capacitor connected across said line loop and provided with a resistive discharge path.

5. The combination defined in claim 4, further comprising a blocking capacitor inserted between said line loop and said storage capacitor.

6. The combination defined in claim 5, further comprising a charging diode interposed between said blocking capacitor and said storage capacitor.

7. The combination defined in claim 4 wherein said storage capacitor is part of an integrating circuit.

8. The combination defined in claim 7 wherein said Zener diode is inserted in said discharge path.

9. The combination defined in claim 8 wherein said discharge path comprises a resistive voltage divider in series with said Zener diode, said base being connected to a tap of said voltage divider.

10. In a subscriber's telephone set connected to a central office by way of two wires forming a normally open-circuited line loop and provided with a ringer lying together with a series capacitor in a shunt branch of the line loop connected across said wires, the combination therewith of a unit for the suppression of spurious ringing currrents, said unit comprising normally nonconductive electronic switch means in said shunt branch with an input circuit connected across said wires, said input circuit including threshold-sensing means for rendering said electronic switch means conductive in response to incoming oscillations of a predetermined minimum amplitude.

11. The combination defined in claim 10 wherein said electronic switch means comprises a transistor shunted by a diode in antiparallel relationship therewith.

* * * * *